United States Patent
Lee et al.

(10) Patent No.: US 9,668,212 B2
(45) Date of Patent: May 30, 2017

(54) PHYSICAL LAYER LOW POWER COMMUNICATION METHOD AND APPARATUS

(71) Applicant: Electronics and Telecommunications Research Institute, Daejeon (KR)

(72) Inventors: Il Gu Lee, Gwangmyeong (KR); Jeong Chul Shin, Seoul (KR); Hee Soo Lee, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 52 days.

(21) Appl. No.: 14/488,188

(22) Filed: Sep. 16, 2014

(65) Prior Publication Data

US 2015/0103714 A1   Apr. 16, 2015

(30) Foreign Application Priority Data

Oct. 14, 2013   (KR) .................. 10-2013-0121915

(51) Int. Cl.
| | |
|---|---|
| *G08C 17/00* | (2006.01) |
| *H04W 52/02* | (2009.01) |
| *H04L 1/00* | (2006.01) |
| *H04L 1/16* | (2006.01) |
| *H04L 1/20* | (2006.01) |

(52) U.S. Cl.
CPC ....... *H04W 52/0222* (2013.01); *H04L 1/0006* (2013.01); *H04L 1/0027* (2013.01); *H04L 1/1671* (2013.01); *H04L 1/201* (2013.01); *H04L 1/203* (2013.01); *H04L 1/0036* (2013.01); *Y02B 60/50* (2013.01)

(58) Field of Classification Search
CPC ............ H04L 27/2613; H04L 27/2655; H04L 27/2675
See application file for complete search history.

(56) References Cited

U.S. PATENT DOCUMENTS 7,593,378 B1 * 9/2009 Murali ............. H04W 52/0245
                                                      370/210
8,064,411 B2 * 11/2011 Ecclesine ......... H04W 52/0235
                                                      370/311

(Continued)

FOREIGN PATENT DOCUMENTS

| EP | 2 357 773 A2 | 8/2011 |
|---|---|---|
| KR | 10-2005-0025374 A | 3/2005 |

(Continued)

*Primary Examiner* — Khaled Kassim
*Assistant Examiner* — Berhanu Belete

(57) ABSTRACT

A physical layer low power communication method and apparatus are provided. The physical layer low power communication method may include receiving a data packet from a transmitter, measuring a channel quality using a preamble and signal field information included in the data packet and determining whether recovery of the data packet is possible, calculating an error generation rate according to a determination result, and discarding the data packet and operating in a power save mode when the error generation rate is higher than a predetermined reference.

16 Claims, 12 Drawing Sheets

(56) References Cited

U.S. PATENT DOCUMENTS

| | | | | |
|---|---|---|---|---|
| 8,576,761 B1* | 11/2013 | Pitchaiah | H04W 52/0206 | 370/311 |
| 2004/0161066 A1* | 8/2004 | Hwang | H04L 25/03159 | 375/350 |
| 2004/0202196 A1* | 10/2004 | Sindhushayana | H04L 1/0002 | 370/465 |
| 2004/0233839 A1* | 11/2004 | Troulis | H04L 25/0244 | 370/210 |
| 2005/0013391 A1* | 1/2005 | Boer | H04L 1/208 | 375/340 |
| 2005/0032514 A1* | 2/2005 | Sadri | H04W 52/346 | 455/423 |
| 2005/0122895 A1* | 6/2005 | Zhou | H04L 27/2657 | 370/210 |
| 2005/0152358 A1* | 7/2005 | Giesberts | H04L 29/06 | 370/389 |
| 2005/0152359 A1* | 7/2005 | Giesberts | H04L 1/0083 | 370/389 |
| 2006/0005058 A1* | 1/2006 | Chen | G06F 1/3203 | 713/320 |
| 2006/0093143 A1* | 5/2006 | Maeda | H04L 9/0852 | 380/256 |
| 2006/0176968 A1* | 8/2006 | Keaney | H03M 13/3961 | 375/260 |
| 2006/0193277 A1* | 8/2006 | Keaney | H04L 1/0045 | 370/310 |
| 2006/0251016 A1* | 11/2006 | Lee | H04L 1/0021 | 370/329 |
| 2007/0047666 A1* | 3/2007 | Trachewsky | H04L 1/0006 | 375/267 |
| 2007/0066259 A1* | 3/2007 | Ryan | H03G 3/3078 | 455/234.1 |
| 2007/0201419 A1* | 8/2007 | Miller | H04W 52/0225 | 370/338 |
| 2008/0109711 A1* | 5/2008 | Morioka | H04L 1/0063 | 714/807 |
| 2008/0181156 A1* | 7/2008 | Ecclesine | H04W 52/0235 | 370/311 |
| 2008/0219381 A1* | 9/2008 | Karaoguz | H04L 1/0054 | 375/316 |
| 2008/0311856 A1* | 12/2008 | Wallington | H04W 52/267 | 455/67.13 |
| 2009/0221251 A1* | 9/2009 | Yi | H04L 1/0036 | 455/226.3 |
| 2010/0107042 A1* | 4/2010 | Sawai | H04L 27/2675 | 714/799 |
| 2010/0331056 A1* | 12/2010 | Taghavi Nasrabadi | H04W 16/14 | 455/574 |
| 2011/0087952 A1* | 4/2011 | Marin | H04L 1/0072 | 714/792 |
| 2011/0149773 A1* | 6/2011 | Lee | H03G 3/3078 | 370/252 |
| 2011/0194475 A1* | 8/2011 | Kim | H04L 1/0053 | 370/311 |
| 2012/0213177 A1* | 8/2012 | Lee | H04W 52/0216 | 370/329 |
| 2012/0314653 A1* | 12/2012 | Liu | H04W 28/065 | 370/328 |
| 2012/0320889 A1* | 12/2012 | Zhang | H04L 1/004 | 370/338 |
| 2013/0016642 A1* | 1/2013 | Banerjea | H04L 27/2613 | 370/311 |
| 2013/0051260 A1* | 2/2013 | Liu | H04L 27/2613 | 370/252 |
| 2013/0155926 A1* | 6/2013 | Ly-Gagnon | H04W 52/0229 | 370/311 |
| 2013/0176926 A1 | 7/2013 | Lee et al. | | |
| 2013/0326308 A1* | 12/2013 | Angelopoulos | H03M 13/373 | 714/758 |
| 2013/0343211 A1* | 12/2013 | Liu | H04L 25/0204 | 370/252 |
| 2014/0177501 A1* | 6/2014 | Seok | H04W 52/0216 | 370/311 |
| 2015/0237578 A1* | 8/2015 | Gogate | H04W 52/0235 | 370/311 |

FOREIGN PATENT DOCUMENTS

| KR | 10-2011-0068168 A | 6/2011 |
|---|---|---|
| KR | 10-2012-0071110 A | 7/2012 |

* cited by examiner

FIG. 4A

| TX Quality Metric | Remedy Category | Remedy Level | Retry Threshold |

FIG. 4B

| Power Save Mode | Power Save Mode Type | Power Save Duration | TX Quality Metric | Remedy Category | Remedy Level | Retry Threshold |
|---|---|---|---|---|---|---|

FIG. 5

| Power Save Mode | RX Quality Metric | Power Save Mode Type | Power Save Duration | Recommended Remedy |
|---|---|---|---|---|

PHYSICAL LAYER LOW POWER COMMUNICATION METHOD AND APPARATUS

CROSS-REFERENCE TO RELATED APPLICATION

This application claims the benefit of Korean Patent Application No. 10-2013-0121915, filed on Oct. 14, 2013, in the Korean Intellectual Property Office, the disclosure of which is incorporated herein by reference.

BACKGROUND

1. Field of the Invention

The present invention relates to a transmission method for physical layer low power communication and an apparatus for the same.

2. Description of the Related Art

Recently, wireless local area network (WLAN) standard continues development to support a wider service area than the past and support a ceaseless service in a moving environment in which a movement speed is much increased in comparison to the past. According to institute of electrical and electronics engineers (IEEE) 802.11a/b/g standard, data transmission at a physical layer data rate maximally of about 54 Mbps using a bandwidth of about 20 MHz in a 2.4 GHz or 5 GHz band via a single antenna is enabled. According to IEEE 802.11p, data transmission in a fast moving vehicle is supported in a 5 GHz band at a data rate up to maximally about 27 Mbps based on an IEEE 802.11a physical layer.

In IEEE 802.11n standard, a plurality of antennas are used by applying a multiple input multiple output (MIMO) technology and a bandwidth up to about 40 MHz is supported, thereby supporting a physical layer data rate of about 600 Mbps. IEEE 802.11ac standard supports a data rate to transmit a gigabyte per second using maximally eight antennas and a bandwidth of about 160 MHz. In particular, the IEEE 802.11ac standard enables a single access point (AP) to transmit data to a plurality of users simultaneously, by applying the MIMO technology.

As a next generation WLAN standard following IEEE 802.11ac, high efficiency WLAN standard for increasing efficiency of the conventional WLAN has been discussed in an unlicensed band of 2.4 GHz or 5 GHz. Whereas the conventional WLAN shows a low efficiency with respect to a technical performance due to interference, high efficiency WLAN (HEW) which is the next generation WLAN standard is expected to show high performance in view of throughput, delay, and energy efficiency. A method for increasing spectrum efficiency and network throughput in an environment crowded with APs and stations, which is a mainly considered scenario, has been actively discussed.

As smart devices are popularized, users of the mobile internet are continuously increasing. With an increase in real time traffic such as high capacity multimedia, for example sound, image, and the like, a bandwidth and speed of a network device for accepting the traffic are also increasing. With rapid spread of high performance intelligent mobile terminals, demands of the users are continuously diversified and increased.

However, energy consumption is increasing in proportion to a performance increase of the network device. Since wireless communication devices equipped with a high communication technology use a strong processor, an affluent memory, a wide screen, and an open operation system (OS), an energy budget of a wireless communication interface with a limited battery capacity should be extremely limited.

Wireless communication systems are rapidly developing to accept additional elements and technologies to add new functions and increase the performance. However, development in a battery size and a battery capacity is relatively slow. Accordingly, in regard to the wireless communication systems, there is a desire for a method for using the limited battery capacity longer and more efficiently.

Due to a limited power capacity of a wireless communication mobile terminal, a research for reducing the energy consumption is actively conducted. In particular, it is known that, in mobile devices such as a smart phone, a tablet, a notebook, and a sensor, most of energy is inefficiently consumed in the wireless communication interface. Since the battery capacity is limited in the mobile terminal or the sensor, a technology for minimizing energy consumption is necessary.

In a mobile node, most of energy is consumed in a central processor unit (CPU) and the wireless communication interface. The CPU may reduce energy consumption by variably controlling a clock frequency and a voltage supply according to a load to be processed and requirements of an application program. That is, when the CPU is operated at a low frequency and a low voltage or when a task to be processed is absent, the operation may be suspended until the task is generated.

A wireless interface may reduce power consumption by two methods as follows.

1) The wireless interface is awake only when there is data to be exchanged with another wireless device. Otherwise, a power save mode is maintained to reduce energy consumption.

2) When a received packet does not correspond to an identifier (ID) of the wireless interface, data processing is not performed to reduce energy consumption.

However, according to the foregoing technologies, the efficiency may be deteriorated since an environment and condition of a mobile node are not considered. In a conventional wireless modem physical layer, energy consumption has been reduced by setting a maximum operation frequency to be low, by minimizing a voltage supply or decreasing complexity, and by variably controlling the clock frequency and the voltage supply according to the load to be processed. However, reduction in the operation frequency, the voltage supply, and the complexity is limited with a conventional semiconductor processing technology. Since those three factors are in trade-off relationships with the performance, meeting of performance requirements of the system is limited.

SUMMARY

Unsatisfactory energy efficiency, interference, coverage, transmission capacity, unstable transmission rate, and the like are typical limits of a wireless local area network (WLAN) technology. According to a spread of smart devices equipped with a WLAN chip, a great number of access points (AP) are being used. However, an actual increase in performance is not meeting expectation due to signal collision caused by overlap of a service area between APs and a hidden node problem.

In particular, since the WLAN is required to perform high speed digital processing to support a high performance service, a high frequency clock is used and a great hardware size is required. In addition, since a relatively high voltage is used, power consumption is extremely high.

A power saving protocol of a medium access control (MAC) level introduced to overcome the high power consumption defines a sleep mode. When there is no packet to be exchanged, the WLAN is converted into the sleep mode to interrupt an unnecessary clock or voltage supply of the circuit, thereby reducing the power consumption.

In a MAC layer, the energy consumption may be reduced by a method that keeps an awake state only when there is data to be exchanged with another wireless device using a separate control signal periodically exchanged and maintains a power save mode when there is no data to be exchanged.

Here, the control signal may have a relatively long time period due to interrupt processing of MAC layer hardware and software. Due to the trade off relationships between the performance, for example a service quality including throughput and delay, and the power consumption, use of the power save mode of the MAC layer is limited. Furthermore, in an active mode, not the sleep mode, a reception standby mode needs to be maintained since a packet receiving time is unknown. Even when a packet is received, whether the received packet is to be received by a corresponding terminal and whether recovery of the packet will succeed are not guaranteed. Therefore, reduction in the power consumption is limited with the conventional technology.

Accordingly, there is a demand for a power saving technology capable of preventing unnecessary processing in a physical layer to efficiently support a multiple transmission mode frame for the high performance service.

According to an aspect of the present invention, there is provided a physical layer low power communication method including receiving a data packet from a transmitter; measuring a channel quality using a preamble and signal field information included in the data packet and determining whether recovery of the data packet is possible; calculating an error generation rate according to a determination result; and discarding the data packet and operating in a power save mode when the error generation rate is higher than a predetermined reference.

The physical layer low power communication method may further include transmitting a response control frame including channel state information to the transmitter when the power save mode operation is finished.

The discarding the data packet and operating in the power save mode may include confirming a length of the data packet and a data rate using the signal field information; calculating a transmission time of the data packet based on the length of the data packet and the data rate; and operating in the power save mode for the transmission time.

The discarding the data packet and operating in the power save mode may include recording the channel state information after the transmission time is passed, and the channel state information comprises at least one of a reason for failing to receive the data packet and a transmission type of a next data packet to be transmitted determined through an adaptive algorithm.

The power save mode may be implemented by gating a clock or using a clock equal to or lower than a predetermined reference, or by designing a circuit that does not supply power.

The physical layer low power communication method may further include starting a long term power save mode when the data packet is discarded and the power save mode is performed by a predetermined number of times or more.

The starting of the long term power save mode may include transmitting an operation time of the long term power save mode to the transmitter using a power save mode type field of the response control frame.

The transmitting of the response control frame may include transmitting the data packet including signal information of the power save mode to the transmitter when the signal information of the power save mode is not included in the response control frame.

The discarding the data packet and operating in the power save mode may include operating in the power save mode after recovery processing latency of a signal field of a physical layer is completed when the response control frame is included in the signal field.

The discarding the data packet and operating in the power save mode may include operating in the power save mode after recovery processing latency of a service field of a physical layer is completed when the response control frame is included in the service field.

Effect

According to embodiments of the present invention, whether to continue packet processing or whether to discard the packet and convert into a power save mode is determined using state information of a channel of a transmission packet and signal field information. Therefore, processing of an entire packet becomes unnecessary and power consumption may be reduced.

Wireless local area network (WLAN) standard supports physical layer power saving by defining a partial association identifier (PAID) using an association identifier (AID) in a signal field. AID is a means for an access point (AP) to identify a terminal present in a business support system (BSS) by allocating a unique 16 bit ID to the terminal when the terminal is connected with the AP. PAID is expressed by only 9 bits which is a low significant bit (LSB) of AID. AID is transmitted as being included in the MAC field whereas PAID is transmitted as being included in the signal field of the physical layer. AID is introduced to uniquely identify a terminal in the BSS and is able to uniquely identify $2^{16}$ terminals. PAID is able to identify $2^9$ terminals, and determine whether the received packet is destined for the PAID by only decoding the signal field in the physical layer. Therefore, when the packet is not destined for the PAID, the PAID does not perform decoding of the packet anymore and converts into the power save mode for power saving.

Although the PAID may save power of a receiver using destination information of the packet, the PAID may cause waste of power since it performs processing irrespective of a reception success rate as long as the ID corresponds. Although the received packet is destined to the corresponding terminal, the receiver may determine channel state information and success in reception of the received packet by only a preamble and the signal field information when a channel state is poor. Accordingly, power of the physical layer may be more efficiently saved.

In this case, the terminal using the power saving method is converted into the power save mode and fails to receive the packet. As the terminal informs a transmission terminal or AP through a response control frame of a proof of converting into the power save mode without processing entire data, a transmission success rate of a next packet may be increased.

According to embodiments of the present invention, a short sleep mode and a long sleep mode are included to further increase a power saving effect of the physical layer. The short sleep mode is for entering the power save mode for a short time and the long sleep mode is for entering the power save mode for a long time.

By effectively operating the short sleep mode and the long sleep mode, a power consumption reduction effect may be increased in proportion to a length of a transmission packet in comparison to in a system not using the method of the embodiments of the present invention. In particular, when power saving is not solved merely by change of a transmission method, power consumption efficiency may be further increased by converting into the long sleep mode in an environment with a poor channel state.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIGS. 4A and 4B are diagrams illustrating a configuration of signal information of a data frame, according to an embodiment of the present invention;

FIG. 5 is a diagram illustrating a configuration of signal information of a response control frame, according to an embodiment of the present invention;

DETAILED DESCRIPTION

Figure 1:
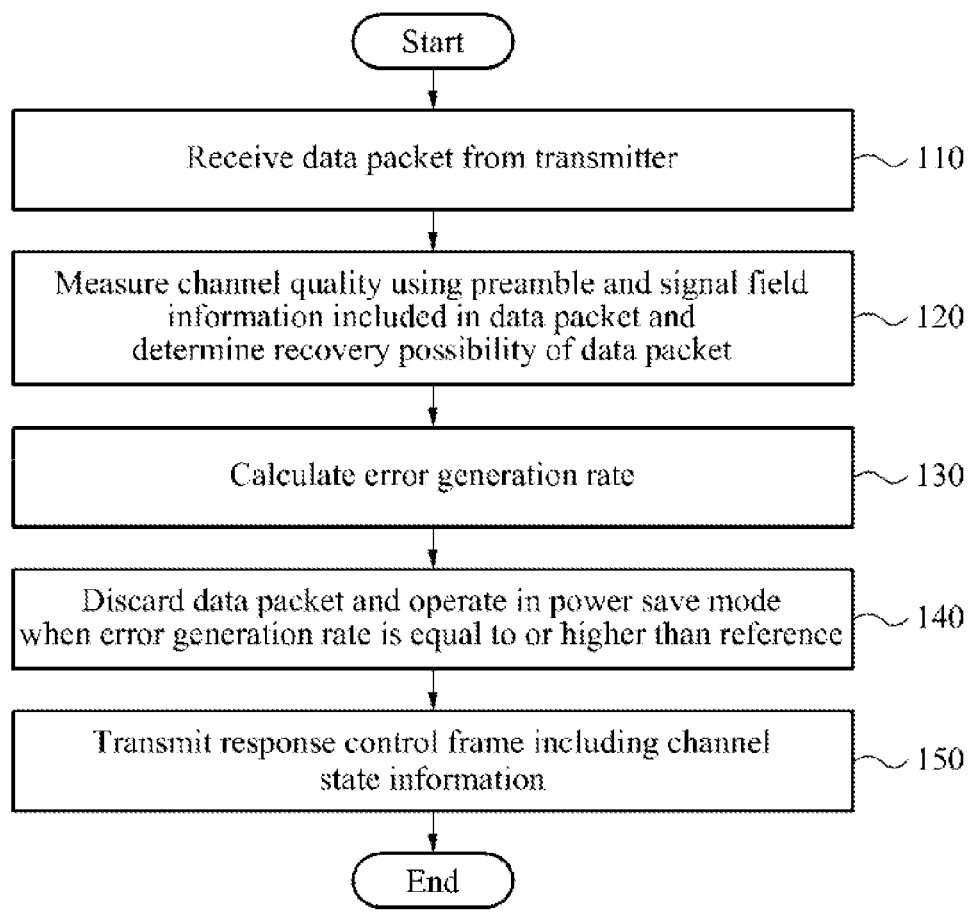
FIG. 1 is a flowchart illustrating a physical layer low power communication method providing a power save mode, according to an embodiment of the present invention.

Reference will now be made in detail to exemplary embodiments of the present invention, examples of which are illustrated in the accompanying drawings, wherein like reference numerals refer to the like elements throughout.

Hereinafter, a physical layer low power communication method and system will be described with reference to the accompanying drawings.

A following description relates to a frame transmission method for low power communication of a wireless communication system and a protocol. Although the embodiment of the present invention will be described in detail with respect to wireless local area network (WLAN) as an example, other types of wireless communication system may apply the embodiment of the present invention.

The embodiment of the present invention includes a method and apparatus for estimating reception success possibility of a packet received through a preamble and signal field information before a receiver decodes an entire packet. The method and apparatus aims at reduction in power consumption by processing the preamble and the signal field located at an entry of the packet first, thereby determining reception possibility of a following packet, and not performing processing anymore when reception is unavailable.

A WLAN system determines whether another signal is present in a currently used channel for a predetermined time. When another signal is absent, the WLAN system determines that the channel is in an idle state and tries transmission. When carrier sensing is performed, the WLAN determines the channel is in a busy state, that is, in use, and defers transmission.

The WLAN system defines a power saving protocol informing of presence of a packet to be exchanged using a beacon signal. When a beacon signal is received, which informs that there is no packet to be exchanged, a terminal using a power saving mode is converted into a sleep mode and consumes minimum power, waiting for a next beacon. In a predetermined time, the terminal awakes from the sleep mode and receives the beacon to determine whether there is a packet to be exchanged. The power saving protocol is implemented in at least a medium access control (MAC) level. When the terminal is waked and activated due to the packet to be exchanged, the terminal needs to maintain a receiving mode.

FIG. 1 is a flowchart illustrating a physical layer low power communication method providing a power save mode, according to an embodiment of the present invention. The method may be performed by interaction between a transmitter and a receiver of a WLAN system. The receiver may be a user terminal such as a smart phone and a computer.

In operation 110, a data packet may be received from the transmitter. The data packet may include a preamble and signal field information at an entry.

In operation 120, a channel quality is measured using the preamble and the signal field information included in the data packet, and possibility of recovery of the data packet is determined.

Therefore, since reception success possibility is determined in advance before the entire packet is decoded by the corresponding receiver through the preamble and the signal field information of the received data packet, processing is not performed anymore when reception is unavailable and accordingly power consumption may be reduced.

In the embodiment, the receiver may calculate channel state information of the received packet, such as a signal to noise ratio (SNR), fading, Doppler, interference, offset, and the like, using repetitive preamble information. For example, in the WLAN communication system, the SNR may be obtained by calculating a noise quantity using a difference between repetitive long preambles and obtaining a signal power. A transmission mode of the received packet may be obtained by decoding the signal field. The transmission mode may include various parameters including a data packet length, a modulation coding scheme (MCS), a bandwidth, a channel coding type, smoothing, whether beam forming is supported, and the like, which are defined with respect to the WLAN.

When the channel state information estimated through the preamble is known and the transmission mode of the received packet is obtained through the signal field, in operation 130, the receiver may calculate an error generation rate in advance by comparing the transmission mode of the data packet with respect to the channel state provided before decoding of a long data payload. When the error generation rate is lower than a predetermined reference, the receiver may continue to receive the data packet.

Conversely, in operation 140, when the error generation rate is higher than the predetermined reference as a result of analysis of the preamble and the signal field information of the received packet, the receiver may not decode but drop the data packet and operate at a power save mode.

The power save mode operation may be achieved by gating a clock so that processing is no more performed, using a minimum clock, or using a circuit design method that does not supply power.

In the embodiment, the receiver operating at the power save mode may stay in the sleep mode during a transmission time of the corresponding data packet, obtained through the signal field information, and return to a normal operation mode when the transmission time ends. Here, the transmission time of the data packet is calculated using a length of the data packet and a data rate, by referencing the WLAN standard.

When the transmission time ends, the channel state information to be transmitted to the transmitter may be recorded. The channel state information may include a reason for failing to receive the data packet, a transmission method for a data packet to be transmitted later, which is determined by an adaptive algorithm, and the like. The channel state information may be recorded in the form to be easily decoded in the transmitter.

In operation 150, the receiver may transmit the response control frame including the recorded channel state information to the transmitter. The transmitter having received the response control frame may select a transmission method for solving a poor channel condition in view of the receiver, and load a fact that the transmission method is changed in the signal field information to transmit a next data packet using the changed transmission method.

For example, when the SNR is low, transmission may be performed by increasing power. When the performance is greatly reduced due to the Doppler effect, transmission may be performed using a traveling pilot which is a pilot transmission method, in which location is changed, instead of a static pilot transmission method. The traveling pilot method refers to a pilot transmission method selected by IEEE 802.11ah of a sub 1 GHz band with respect to an exterior environment where the Doppler effect is relatively high. The static pilot refers to a pilot transmission method used by the WLAN for a conventional low speed and near field interior environment. When the SNR is low, a channel bandwidth or a transmission band may be changed to perform transmission. In a channel having a high fading effect, a symbol duration may be increased by reducing MCS, selecting a long guard interval mode, or transmitting by downsampling.

According to another embodiment, a low power protocol may be implemented in such a manner that the receiver informs the transmitter of a recommended transmission method through the response control frame, and the transmitter receiving the response control frame performs retransmission by the recommended transmission method or retransmits whether the recommended transmission method is practicable. The aforementioned method needs less bit information than a method of feeding back the channel state information.

Although the transmission method for the data packet is changed by repetition of operations 110 to 150, when it is determined that decoding of the data packet is difficult as a result of analyzing the preamble and the signal field information of the data packet received by the receiver, the receiver may enter the power save mode again and record that the data packet is not normally received by entering the channel state information and the sleep mode through the response control frame.

When the foregoing process is repeated a predetermined number of times or more, the receiver supporting the power save mode may operate in a long term power save mode for operating at the power save mode for a predetermined long time, and transmit an operation time of the long term power save mode to the transmitter through the response control frame. During the operation time, the data packet may be reserved without being transmitted from the transmitter.

Figure 2:
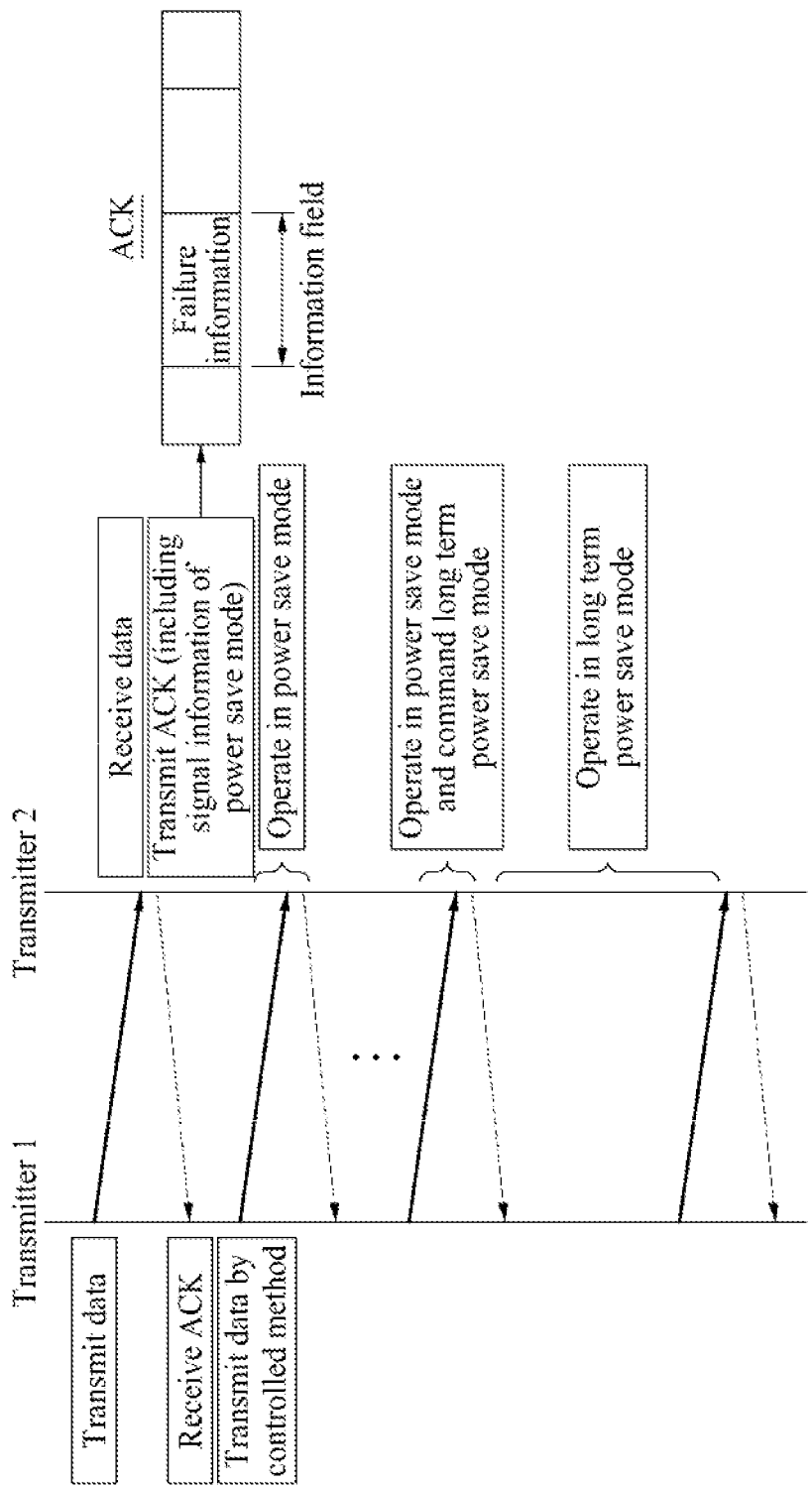
FIG. 2 is a protocol flowchart related to the power save mode, according to an embodiment of the present invention.
Figure 3:
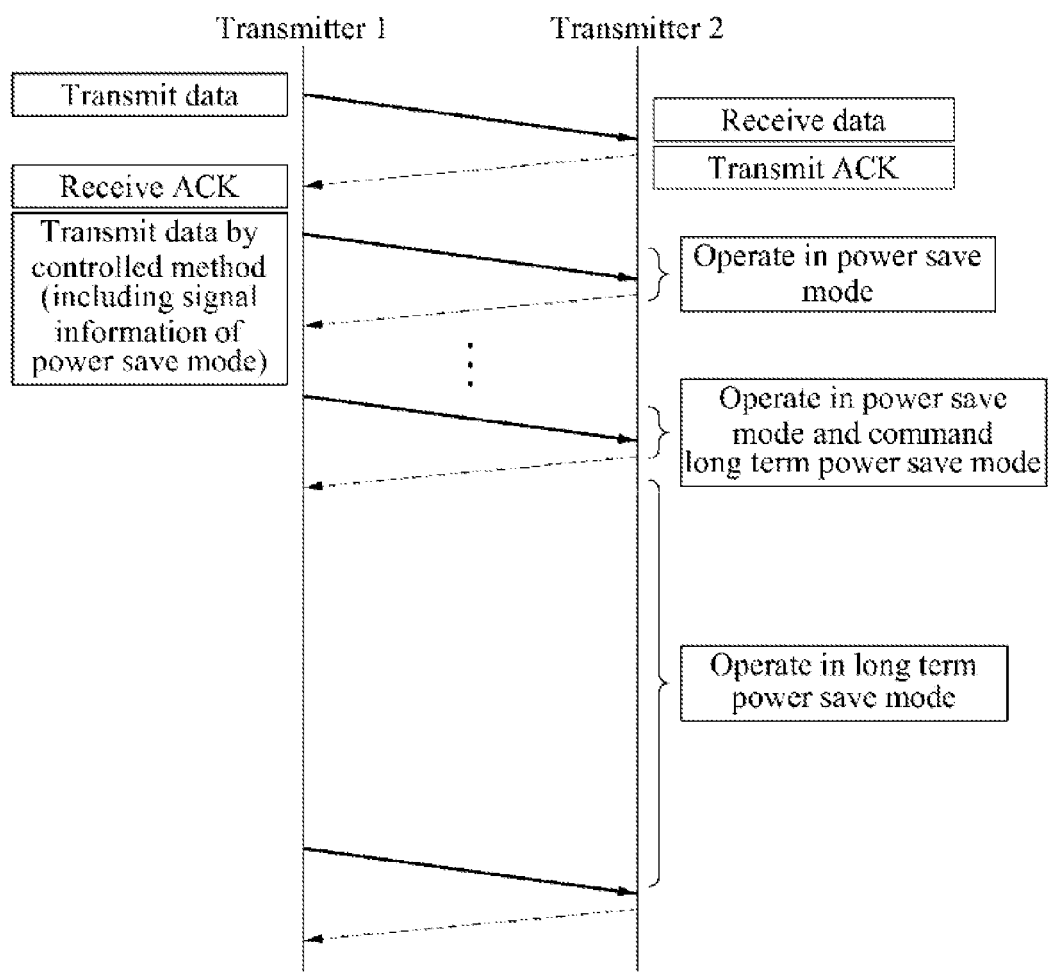
FIG. 3 is a protocol flowchart related to a power save mode operation of when signal information of the power save mode is absent in a response control frame, according to an embodiment of the present invention.

FIGS. 2 and 3 are protocol flowcharts related to the power save mode, according to an embodiment of the present invention.

A transmitter and a receiver are located in a service area. One of the transmitter and the receiver may be an AP while the other one may be a user terminal Both of the transmitter and the receiver may be user terminals.

When it is presumed that the transmitter may transmit a data packet to the receiver, the receiver may measure a channel quality using a preamble and signal field information included in the data packet, determine whether the received data packet may be normally recovered, and determine whether to operate in a power save mode.

When the channel state is determined that the receiver may not normally recover the received packet and an error may be generated based on the preamble and the signal field information, the receiver does not perform processing anymore and enters the power save mode. Here, a sleep mode duration may be determined by calculating a transmission time of the received data packet based on a packet length of a signal field and data rate information.

Meanwhile, based on signal information of the power save mode, included in the response control frame transmitted after the receiver awakes from the sleep mode, the transmitter may transmit an acknowledge (ACK) signal including a fact that the receiver failed to receive the data packet by entering the sleep mode, a reason for entering the sleep mode, for example the channel state, or a transmission method for a next retransmitted packet determined based on transmission method information recommended by the receiver.

Alternatively, as shown in FIG. 3, the receiver may transmit the response control frame including only a fact that the data packet is not received, to the transmitter. In this case, the transmission method of the data packet may be changed by a transmitter adaptive algorithm and the data packet may be transmitted to the receiver by the changed transmission method.

When the reception possibility is lower than a predetermined threshold even after the receiver determines the reception possibility based on the preamble and the signal field information of the packet retransmitted by the transmitter, the receiver may not perform processing anymore but operate in the power save mode. The receiver waked after the transmission time of the corresponding data packet may retransmit the response control frame according to the foregoing method. The reason for failing to receive the data packet or the recommended transmission method may be transmitted using an adaptive algorithm, different from a previous packet.

Next, when the receiver fails in reception and enters the power save mode a predetermined number of times or more, when the transmission method recommended by the receiver is not supported by the transmitter, or when the channel state is not overcome, the receiver may enter the long term power save mode to further save the power.

The aforementioned method may be implemented by exchanging information for power saving through the response control frame or implemented without the response control frame. That is, power save mode information may be included only in signal information of a data transmission frame of the transmitter. The receiver may operate selectively in the power save mode or the long term power save mode according to a power save mode rule of the transmitter.

The signal information for operation in the power save mode may include channel quality information measured by the transmitter and the receiver, a data packet transmission method being applied, a number of tries for entering the power save mode, whether the power save mode is supported, a power save mode duration, a next data packet transmission method, and the like.

FIGS. 4A and 4B are diagrams illustrating a configuration of signal information of a data frame, according to an embodiment of the present invention. FIG. 4A shows a configuration of signal information including power save mode information in the response control frame. FIG. 4B shows a configuration of signal information not including the power save mode information in the response control frame.

When the power save mode information is not included in the response control frame, only a data frame may include the power save mode information. When the receiver does not normally receive even after the predetermined number of tries, the transmitter and the receiver may operate by defining the protocol that the receiver is in the long term power save mode. In addition, whether the power save mode is supported, a power save mode type, the power save mode duration, a channel quality metric, a changed transmission method and level, and the like may be included in the data frame.

FIG. 5 is a diagram illustrating a configuration of signal information for a response control frame, according to an embodiment of the present invention.

A signal field or a service field of the response control frame related to data reception may include any of a power save mode, a channel quality metric of the receiver, a power save mode type, a power save mode duration or sleep mode duration, and a recommended remedy. The response control frame may correspond to any one of normal ACK, a neighbor discovery protocol (NDP) response, and a block ACK.

Figure 6:
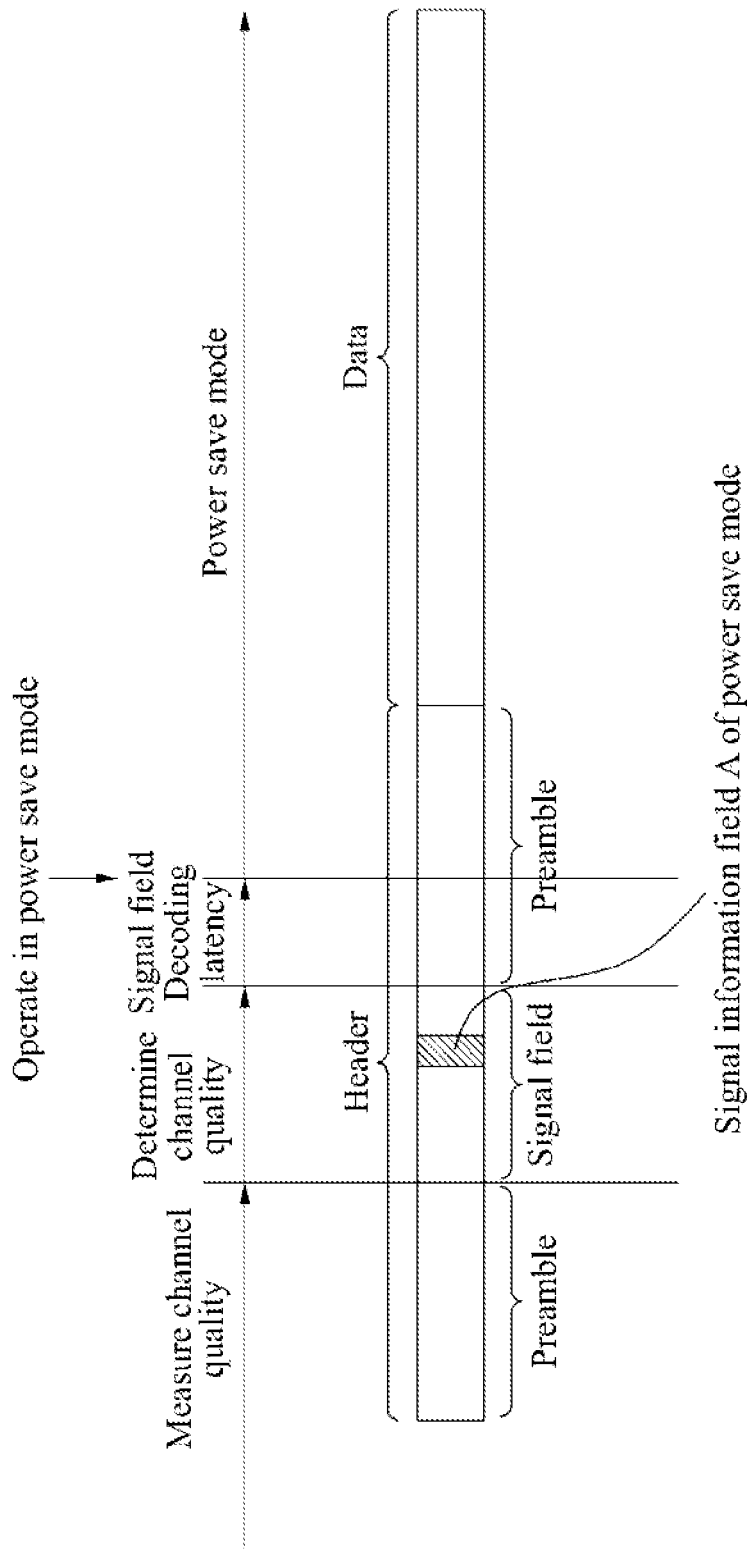
FIG. 6 is a diagram illustrating a power save mode operation according to an embodiment of the present invention.
Figure 7:
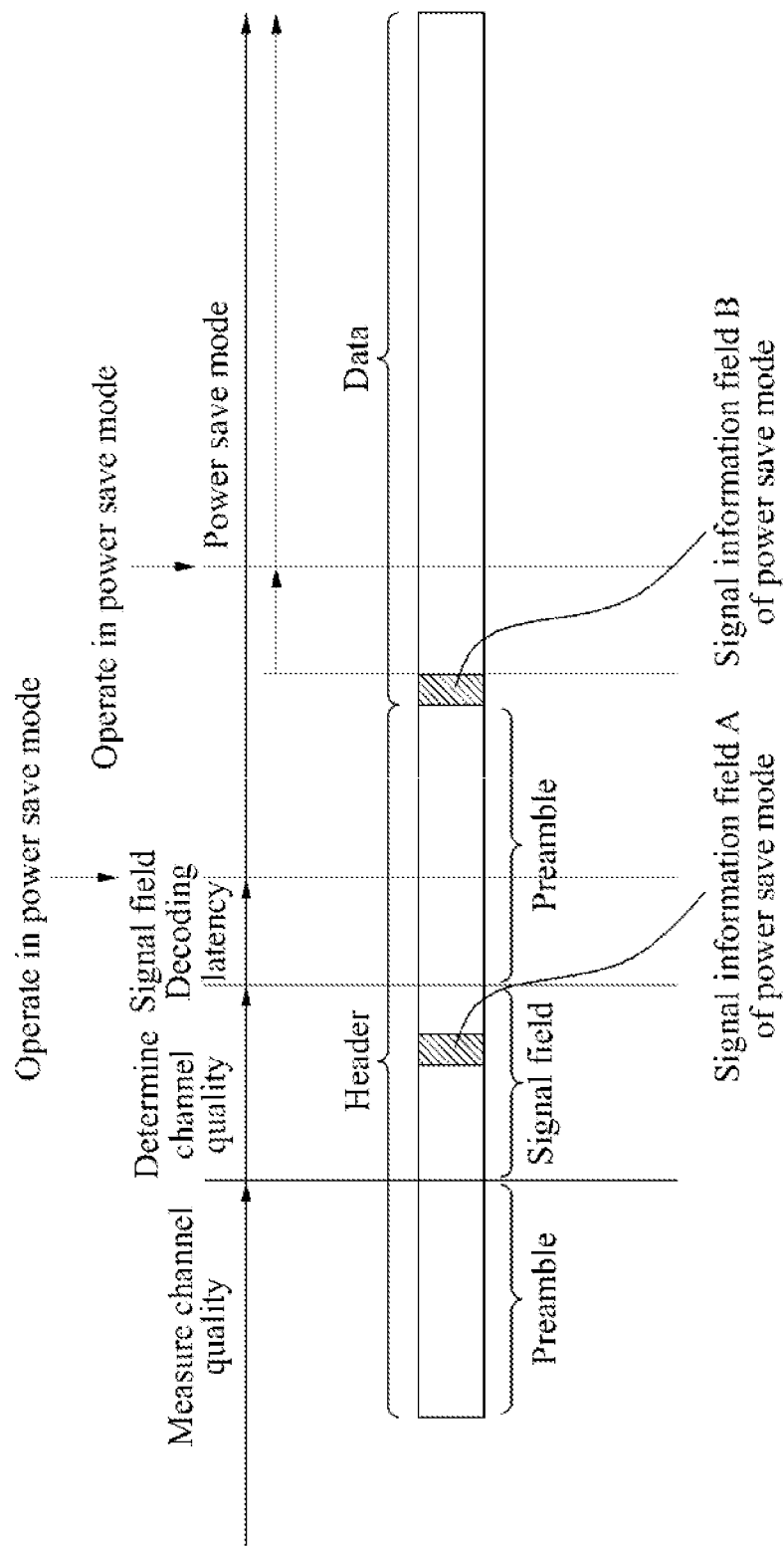
FIG. 7 is a diagram illustrating a power save mode operation according to another embodiment of the present invention.
Figure 8:
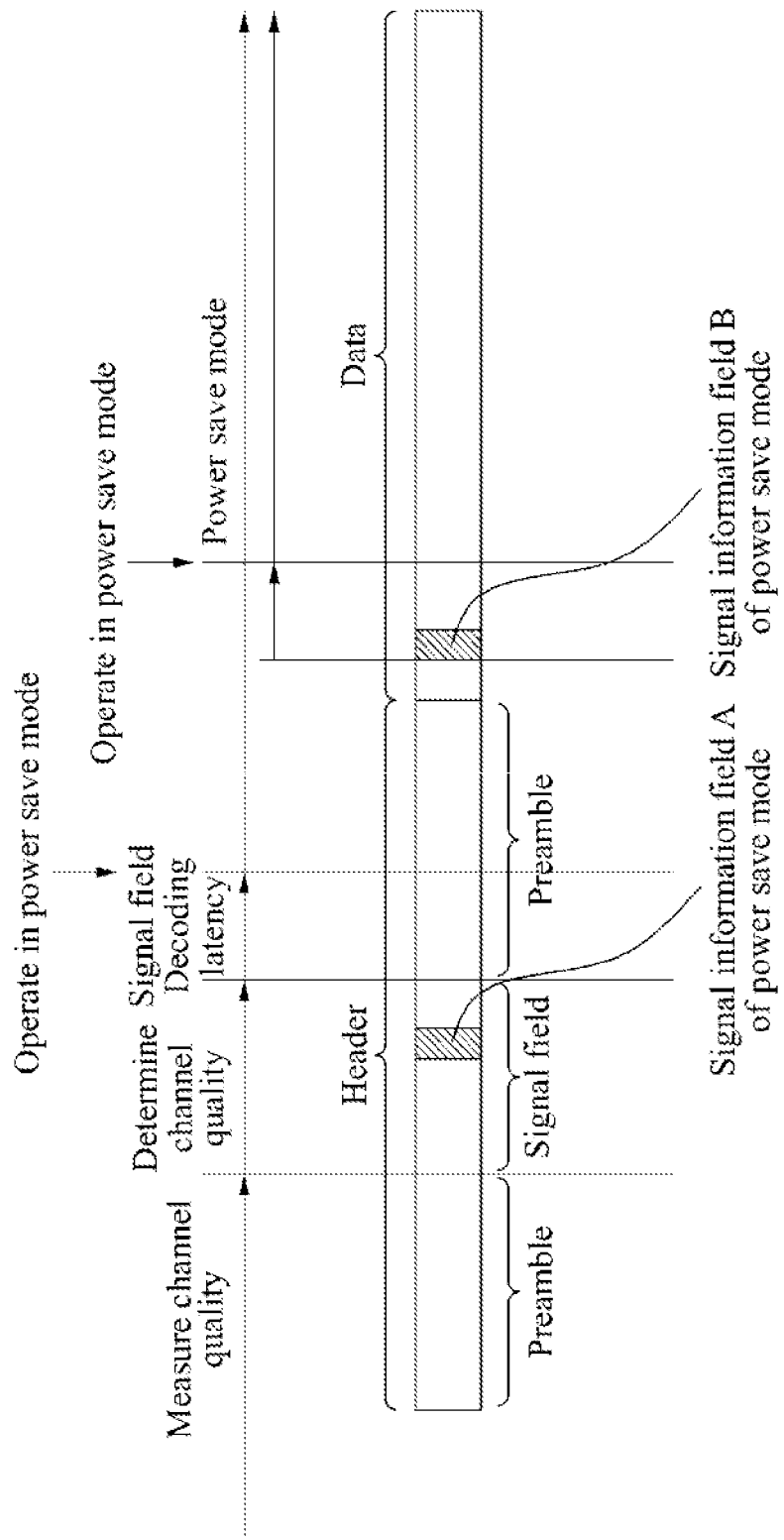
FIG. 8 is a diagram illustrating a power save mode operation according to yet another embodiment of the present invention.

FIGS. 6 to 8 are diagrams illustrating a power save mode operation according to embodiments of the present invention.

A data frame and a response control frame may be included in a signal field of a frame physical layer header, that is, a signal information field A of the power save mode shown in FIG. 6, or in a service field, that is, a signal information field B of the power save mode shown in FIG. 7.

As shown in FIG. 6, when the data frame and the response control frame are included in the signal field of the physical layer, the power save mode may be started after signal field recovery processing latency is completed. When the data frame and the response control frame are included in the service field, the power save mode may be started after the service field recovery processing latency is completed.

Furthermore, based on the reception possibility of the received signal estimated through a preamble and signal field information of the physical layer header, whether to continue processing of the received packet may be determined.

When the signal field and the service field of the physical layer both include the signal information of the power save mode, the operation may be performed as shown in FIG. 8. In this case, when respective field information is distributed non-redundantly, the operation may be achieved without increasing packet header overhead.

Figure 9:
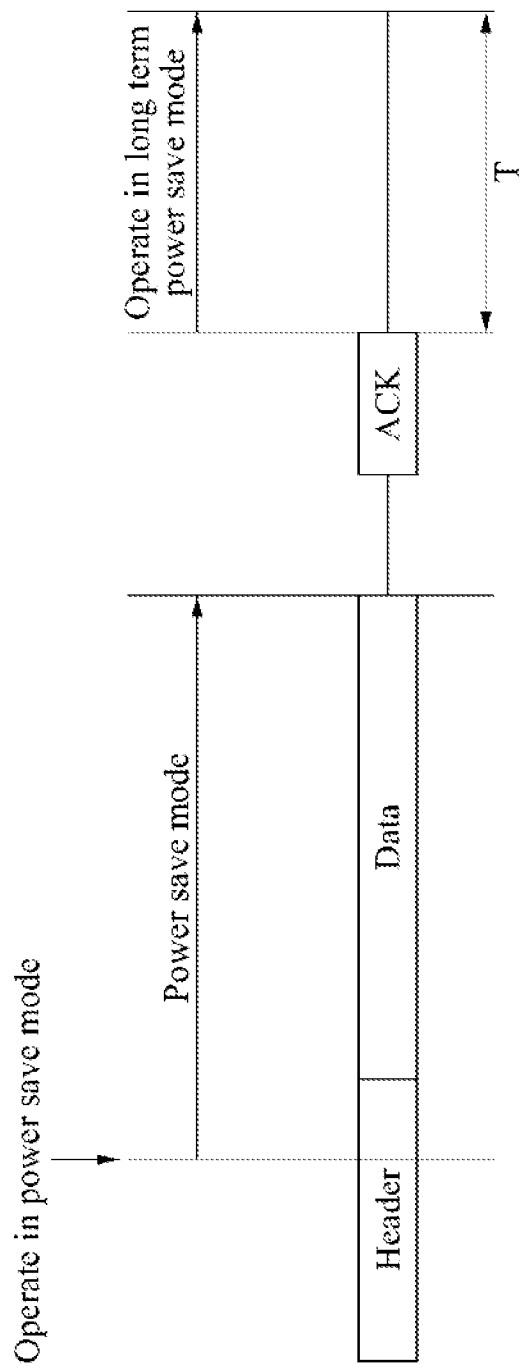
FIG. 9 is a diagram illustrating a difference between a general power save mode and a long term power save mode, according to an embodiment of the present invention.

FIG. 9 is a diagram illustrating a difference between a general power save mode and a long term power save mode, according to an embodiment of the present invention. As illustrated, the power save mode may be separated into the general power save mode and the long term power save mode.

The power save mode refers to a mode for entering the sleep mode for a shorter time than the long term power save mode. Hereinafter, the description will be made with respect to one packet unit as an example. The power save mode as shown in FIG. 9 may be a mode for saving power by maintaining the sleep mode until the end of a data packet, using header information. Although the embodiments are described with respect to physical layer signal field information, service field information may be used. Entry into the power save mode may be determined by judging whether the data packet may be successfully received using the preamble and the signal field information of the physical layer.

When the power save mode is repeated a predetermined number of times or when the transmitter may not support a transmission method for solving the repetition anymore, the long term power save mode may be started. In this case, duration of the power save mode, that is, the sleep mode duration, may be transmitted to the transmitter using a power save mode type field of the response control frame, thereby entering the power save mode. After the power save mode operation for the predetermined time duration, the receiver may be waken and normally operate to receive packets.

Figure 10:
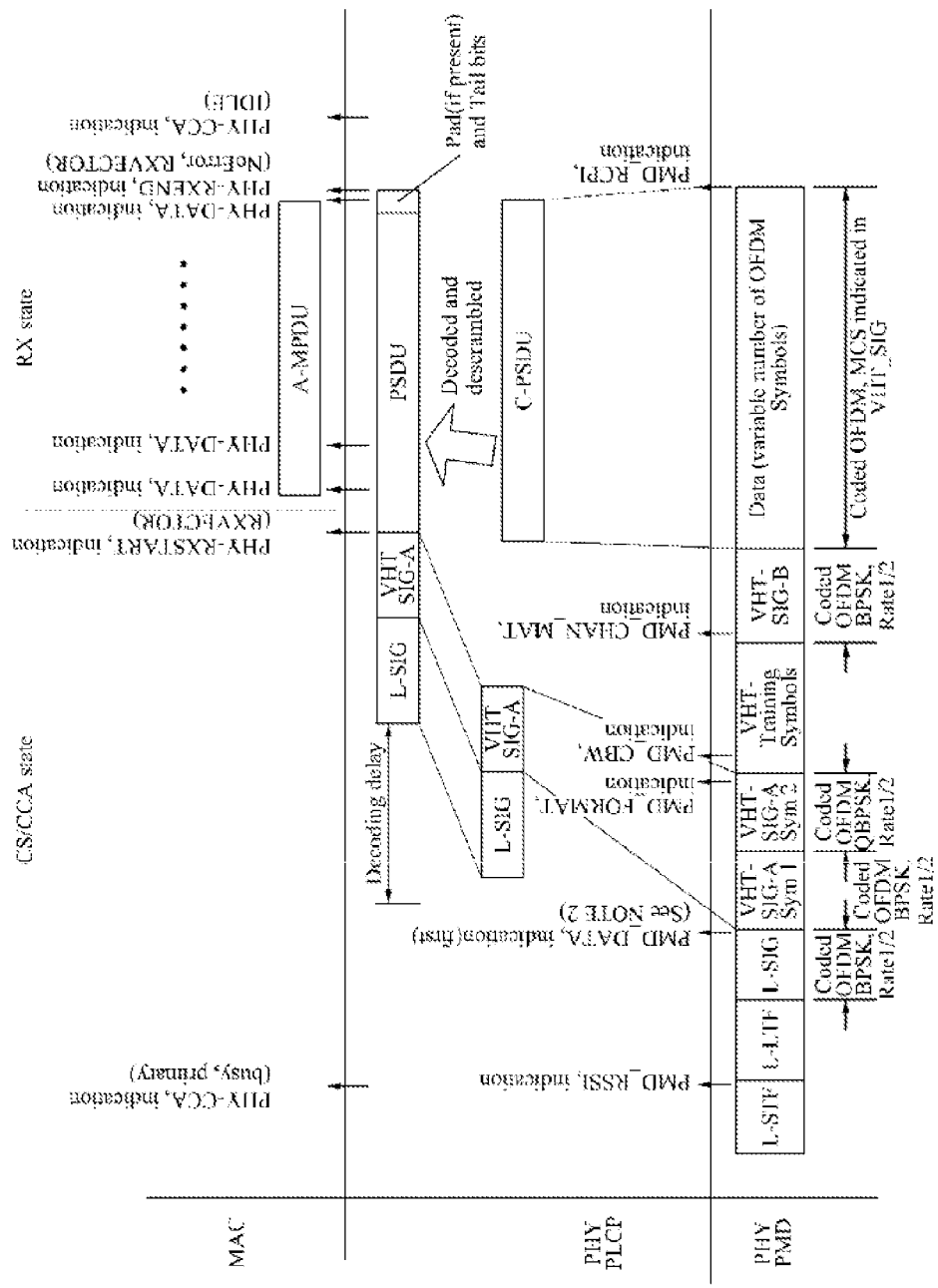
FIG. 10 is a diagram illustrating an institute of electrical and electronics engineers (IEEE) 802.11 physical layer structure according to an embodiment of the present invention.

FIG. 10 is a diagram illustrating a physical layer configuration according to an embodiment of the present invention. The physical layer configuration of IEEE 802.11 may include physical layer management entity (PLME), a physical layer convergence protocol (PLCP) sub layer, and a physical medium dependent (PMD) sub layer. The PLME functions as an interface between MAC layer management entity (MLME) and the physical layer, thereby providing a management function for the physical layer. The PLCP sub layer may transmit a MAC protocol data unit (MPDU) received from a MAC sub layer or transmit a frame received from the PMD sub layer to the MAC sub layer, according to a signal generated by control of the MAC layer between the MAC sub layer and the PMD sub layer. The PMD sub layer, as a PLCP lower layer, supports the physical layer to enable transceiving between two terminals through a wireless medium. The MPDU transmitted by the MAC sub layer is called a physical service data unit (PSDU) in the PLCP sub layer. A-MPDU, which is aggregation of a plurality of MPDUs, may be transmitted.

The PLCP sub layer may add a field including necessary information by a physical layer transceiver during a process of receiving the PSDU from the MAC sub layer and transmitting the PSDU to the PMD sub layer. The added field may include a PLCP preamble, a PLCP header, a tail bit for initiating a convolutional encoder, and the like in the PSDU.

The PLCP preamble may include periodic and repetitive sequences for synchronizing, controlling a gain, or informing of a channel state so that the receiver may successfully recover the PSDU. The PLCP header may include information necessary for recovering the PSDU.

For example, the information may include a packet length, a bandwidth, an MCS, a technology used for transmission, and the like. A data field may include a sequence in which a service field including an initialization sequence for initializing a scrambler and tail bits are bonded and encoded. The data field may be modulated and encoded according to the transmission type included in the PLCP header, and transmitted. The PLCP sub layer of a transmission end may generate a PPDU and transmit the PPDU through the PMD sub layer. A receiving end may receive the PPDU, perform synchronization and gain control by the PLCP preamble, obtain channel state information, and recover by obtaining information necessary for packet recovery through the PLCP header.

IEEE 802.11ac standard supports a bandwidth mode of 20 MHz or 40 MHz that IEEE 802.11n standard supports, and also supports a bandwidth mode of 80 MHz. IEEE 802.11ac standard may transmit signals using non-contiguous two 80 MHz bandwidths simultaneously, that is, non-contiguous 160 MHz, or a contiguous 160 MHz bandwidth.

An AP supporting IEEE 802.11ac standard may transmit packets simultaneously to at least one terminal using a multi user multiple input multiple output (MU-MIMO) transmission technology. In a basic service set of WLAN, an AP may transmit data divided into different spatial streams simultaneously to groups including at least one terminal among terminals associated with the AP. The AP may transmit data to only one terminal by a single user MIMO (SU-MIMO).

When a beam forming technology is supported between an AP and a terminal belonging to a network, transmission may be performed so that a signal gain of a particular single terminal or terminal group is high. A group ID may be allocated to the terminal group to support MU-MIMO transmission. The AP may allocate and distribute the group ID by transmitting a group ID management frame. One terminal may be allocated with a plurality of group IDs.

A WLAN terminal or AP may support different functions depending on a vender that implements a system and manufactures a chip. The standard prescribes not only obligatory items but also optional items. Supported functions may be different according to a version of the implemented standard. For example, whereas convolutional encoding is an obligatory item, low density parity check (LDPC) is an optional item. Beamforming, MU-MIMO, and supporting of a 160 MHz bandwidth may be optional items.

When transmitting the PPDU, the WLAN system may include signal information for the receiving end to correctly recover the PPDU in the header field. Since the signal information is crucial for recovery of the PPDU data, the signal information may be transmitted at a lowest MCS level to be durable against a channel change and a noise.

Very high throughput (VHT) PPDU may be classified into L-STF (Legacy-Short Training Field), L-LTF (Legacy-Long Training Field), L-SIG (Legacy-SIGnal Field), VHT-SIGA (SIGnal Field type A), VHT-STF, VHT-LTF, VHT-SIGB (SIGnal Field type B), and data. High throughput (HT) PPDU may be classified into L-STF, L-LTF, L-SIG, HT-SIG, HT-STF, HT-LTF, and data. Legacy PPDU may be classified into L-STF, L-LTF, L-SIG, and data.

The L-STF may be used for carrier sensing for sensing that a signal is present in a currently used channel, automatic gain control for suiting a wireless signal input to an antenna for an operation area of an analog circuit and an analog-to-digital converter (ADC), and frequency offset compensation.

The L-LTF may used for frequency offset compensation and symbol synchronization, and for channel response estimation for modulating an L-SIG field and an HT-SIG field or VHT-SIG field. The SNR may be estimated using repetition of the two symbols.

Using the repetitive sequences such as the L-STF and the L-LTF, various channel characteristics including interference, the Doppler effect, delay spread, and the like may be estimated.

Signal fields such as the L-SIG, the HT-SIG, and the VHT-SIG may include control information necessary for demodulation of the PPDU received by the terminal or the AP. The control information may include a packet length, MCS, a bandwidth and channel encoding method, beam forming, space-time block coding (STBC), smoothing, MU-MIMO, and a supported transmission technology such as a short guard interval mode, and the like. The VHT-SIG may be transmitted as being divided into a VHT-SIGA field and a VHT-SIGB field, that is, common control information and dedicated information for a particular MU group. ID information such as a group ID and a PAID may also be included.

The HT-STF or the VHT-STF may be used to increase gain control performance of automatic gain control (AGC). Particularly, when the beam forming is used, additional gain control is indispensable.

The HT-LTF or the VHT-LTF may be used for a terminal or an AP to estimate a channel. Different from legacy standard, since the 11n standard or 11ac standard increases the throughput by increasing a number of used subcarriers, new LTF, in addition to the L-LTF, is defined for data recovery. The VHT-LTF may also include a pilot signal for offset compensation.

The data field may include information on data to be transmitted. The data field may be transmitted including a service field and a tail bit by converting the MPDU of the MAC layer into the PSDU.

When the frame is transmitted including power save information to support the power save mode of the embodiment of the present invention, the transmitter and the receiver may perform communication more power efficiently. That is, since whether to perform processing is determined by estimating the reception success possibility, that is, reception success rate, in advance before processing the data payload based on the preamble and the signal information of the received data packet, low power communication is enabled.

Figure 11:
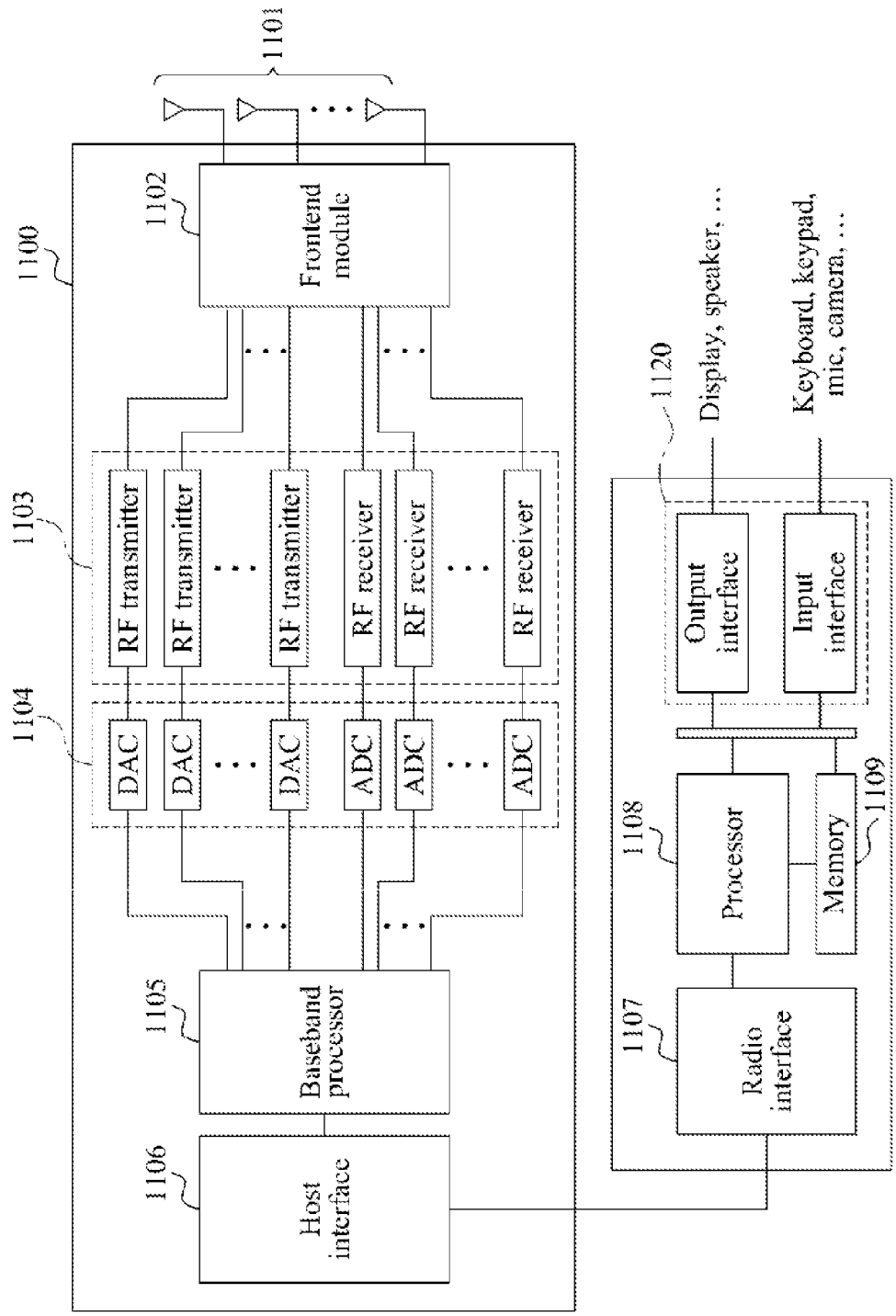
FIG. 11 is a block diagram illustrating a physical layer low power communication system performing a physical layer low power communication method, according to an embodiment of the present invention.

FIG. 11 is a block diagram illustrating a physical layer low power communication system 1100 performing a physical layer low power communication method, according to an embodiment of the present invention. The system 1100 is a system for performing the physical layer low power communication method described with reference to FIGS. 1 to 10.

The system 1100 according to the present embodiment may include a transceiving antenna 1101, a frontend module 1102, a transceiving unit 1103, a digital-to-analog converter (DAC) and ADC 1104, a baseband processor 1105, and a host interface 1106. A radio interface 1107, a processor 1108, a memory 1109, and an input and output interface 1110 may be further included.

A data packet may be transmitted and received through at least one transceiving antenna 1101. An interface between the transceiving antenna 1101 and the transceiving unit 1103 may be implemented by the frontend module 1102.

The frontend module 1102 may include various external devices not included in the transceiving unit 1103 or devices for performance improvement and function expansion. For example, an external transmission power amplifier or an external receiving low noise amplifier, a switch, and the like may be included.

In the transceiving unit 1103, a transmitting unit may modulate and transmit the packet to be transmitted whereas a receiving unit receives and demodulates the packet.

In the low power communication, the transceiving unit 1103 may stay in the power save mode during a transmission time of the data packet. After the transmission time is passed, the transceiving unit 1103 may transmit channel state information related to a reason for entering the power save mode, or transmit at least one of a recommended transmission method for the data packet to be transmitted and a number of times that the physical layer low power communication system enters the power save mode.

The DAC and ADC 1104 may convert a signal type between an analog signal and a digital signal as necessary.

The baseband processor 1105 may generate a frame corresponding to a transmission frame format, extract information from a received frame, or compensate a distorted signal caused by encoding, decoding, a channel, or an analog device. The radio interface 1107 may function as an interface between a wireless communication modem and the host interface 1106.

The processor 1108 may generate and transmit a PPDU format. Also, the processor 1108 may receive the transmitted PPDU, obtain control information by analyzing field information from a received packet, and recover data using the control information. The processor 1108 or a transceiver may include an application specific integrated circuit (ASIC), a logic circuit, or a data processor.

In the embodiment, the processor 1108 may determine whether to operate in the power save mode using the preamble and the signal field information included in the data packet of the received signal. That is, the processor 1108 may calculate an error generation rate related to recovery possibility of the data packet using the preamble and the signal field information, and may determine to operate in the power save mode when the error generation rate is higher than a predetermined reference.

In addition, when the error generation rate is higher than the predetermined reference, the transmission time of the data packet may be calculated using the packet length of the data packet and a data rate, and the system may operate in the power save mode during the transmission time.

The memory 1109 may include at least one of a read only memory (ROM), a read access memory (RAM), a flash memory, a memory card, and a storage. An input device with respect to the input and output interface 1110 may include a keyboard, a key pad, a microphone, a camera and the like. An output device may include a display unit, a speaker, and the like.

According to the embodiments of the present invention, whether to continue packet processing or to discard the packet and convert into the power save mode is determined using state information of the channel of a transmission packet and the signal field information. Therefore, processing of entire packet becomes unnecessary and power consumption may be reduced.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A physical layer low power communication method performed by a receiver, the method comprising:
receiving a data packet from a transmitter;
measuring a channel quality using a preamble and signal field information included in the data packet and determining whether recovery of the data packet is possible based on the measured channel quality;
calculating an error generation rate according to a determination result; and
when the error generation rate is higher than a predetermined reference, discarding the data packet and operating in a power save mode,
wherein the discarding the data packet and operating in the power save mode comprises:
confirming a length of the data packet and a data rate using the signal field information;
calculating a transmission time of the data packet based on the length of the data packet and the data rate; and
operating in the power save mode for the transmission time.

2. The physical layer low power communication method of claim 1, further comprising transmitting a response control frame including channel state information to the transmitter when the power save mode operation is finished.

3. The physical layer low power communication method of claim 2, wherein the transmitting of the response control frame to the transmitter comprises:
loading whether a feedback method that loads the channel state information on the response control frame is supported or not on a signal field and transmitting the signal field.

4. The physical layer low power communication method of claim 2, further comprising:

starting a long term power save mode when the data packet is discarded and the power save mode is performed by a predetermined number of times or more.

5. The physical layer low power communication method of claim 4, wherein the starting of the long term power save mode comprises:
transmitting an operation time of the long term power save mode to the transmitter using a power save mode type field of the response control frame.

6. The physical layer low power communication method of claim 2, wherein the transmitting of the response control frame comprises:
transmitting the data packet including signal information of the power save mode to the transmitter when the signal information of the power save mode is not included in the response control frame.

7. The physical layer low power communication method of claim 2, wherein the discarding the data packet and operating in the power save mode comprises:
operating in the power save mode after processing latency for recovering a signal field of a physical layer is completed when the response control frame is included in the signal field.

8. The physical layer low power communication method of claim 1, wherein the discarding the data packet and operating in the power save mode comprises recording the channel state information after the transmission time is passed, and
the channel state information comprises a reason for failing to receive the data packet or a transmission type of a next data packet to be transmitted by the transmitter, or both.

9. The physical layer low power communication method of claim 1, wherein the power save mode is implemented by gating a clock or using a clock equal to or lower than a predetermined reference, or by designing a circuit that does not supply power.

10. The physical layer low power communication method of claim 1, wherein the discarding the data packet and operating in the power save mode comprises:
operating in the power save mode after processing latency for recovering a service field of a physical layer is completed when the response control frame is included in the service field.

11. A physical layer low power communication method performed by a transmitter, the method comprising:
transmitting a data packet to a receiver;
receiving a response control frame from the receiver when the data packet is not normally received by the receiver; and
changing a data transmission method to a transmission method of a next data packet to be transmitted, the transmission method of the next data packet being included in the response control frame,
wherein the receiver determines whether to receive the data packet by measuring a channel quality using a preamble and signal field information included in the data packet, determining whether recovery of the data packet is possible based on the measured channel quality, calculating an error generation rate according to a determination result, determining whether the error generation rate is higher than a predetermined reference, and, when the error generation rate is higher than a predetermined reference, discarding the data packet and operating in a power save mode, and
wherein the discarding the data packet and operating in the power save mode comprises:
confirming a length of the data packet and a data rate using the signal field information;
calculating a transmission time of the data packet based on the length of the data packet and the data rate; and
operating in the power save mode for the transmission time.

12. The physical layer low power communication method of claim 11, wherein the response control frame comprises at least one of a reason for failing to receive the data packet, channel state information, and the transmission method for the next data packet to be transmitted.

13. The physical layer low power communication method of claim 12, wherein the transmitting of the data packet comprises:
loading on a signal field whether a method of feeding back, to the response control frame, at least one of the reason for failing to receive the data packet, the channel state information, and the transmission method for the next data packet to be transmitted is supported or not, and transmitting the signal field.

14. The physical layer low power communication method of claim 11, wherein the changing of the data transmission method comprises:
extracting the transmission method for the next data packet to be transmitted from signal field information.

15. A physical layer low power communication apparatus comprising:
an antenna to receive and transmit signals;
a transceiving unit to demodulate a received signal and modulate a transmission signal;
a frontend module to function as an interface between the antenna and the transceiving unit;
an analog-to-digital converter and digital-to-analog converter (ADC/DAC) to convert a signal type between an analog signal and a digital signal with respect to the received signal and the transmission signal;
a baseband processor to generate a frame corresponding to a transmission frame format of the transmission signal; and
a processor to determine whether to receive the signals and whether to operate in a power save mode by analyzing field information of the received signal,
wherein the processor calculates an error generation rate related to recovery possibility of a data packet using a preamble and signal field information included in the data packet of the received signal, and, when the error generation rate is higher than a predetermined reference, discards the data packet and operates in the power save mode,
wherein, to discard the data packet and to operate in the power save mode, the processor is configured to:
confirm a length of the data packet and a data rate using the signal field information;
calculate a transmission time of the data packet based on the length of the data packet and the data rate; and
operate in the power save mode for the transmission time.

16. The physical layer low power communication apparatus of claim 15, wherein the baseband processor extracts information from a frame of the received signal and compensates for the received signal distorted during receiving.

* * * * *